United States Patent
Beck

[11] Patent Number: 6,003,838
[45] Date of Patent: Dec. 21, 1999

[54] ELECTROMAGNETIC VALVE

[75] Inventor: Erhard Beck, Weilburg, Germany

[73] Assignee: ITT Manufacturing Enterprises, Inc., Wilmington, Del.

[21] Appl. No.: 09/101,975

[22] PCT Filed: Jan. 29, 1997

[86] PCT No.: PCT/EP97/00382

§ 371 Date: Oct. 14, 1998

§ 102(e) Date: Oct. 14, 1998

[87] PCT Pub. No.: WO97/28391

PCT Pub. Date: Aug. 7, 1997

[30] Foreign Application Priority Data

Jan. 31, 1996 [DE] Germany ............................ 196 03 383

[51] Int. Cl.[6] ................................................. F16K 31/02
[52] U.S. Cl. ............................... 251/129.15; 251/129.17; 335/220; 335/251; 335/255
[58] Field of Search ..................... 335/220, 229, 335/251, 255; 251/129.15–129.19

[56] References Cited

U.S. PATENT DOCUMENTS

| | | | |
|---|---|---|---|
| 5,102,096 | 4/1992 | Siegel et al. | 251/129.15 |
| 5,167,442 | 12/1992 | Alaze et al. | 303/113.2 |
| 5,333,836 | 8/1994 | Fukuyo et al. | 251/129.15 |
| 5,333,945 | 8/1994 | Volz et al. | 303/119.2 |
| 5,401,087 | 3/1995 | Goossens | 303/119.2 |
| 5,511,864 | 4/1996 | Feinartz et al. | 303/119.2 |
| 5,601,275 | 2/1997 | Hironaka | 251/129.15 |
| 5,626,326 | 5/1997 | Goossens et al. | 251/129.15 |
| 5,664,849 | 9/1997 | Burgdorf et al. | 303/116.1 |
| 5,669,675 | 9/1997 | Mueller et al. | 303/119.2 |
| 5,722,633 | 3/1998 | Goossens et al. | 251/129.15 |

FOREIGN PATENT DOCUMENTS

| | | |
|---|---|---|
| 2021283 | 2/1972 | Germany . |
| 4030963 | 4/1992 | Germany . |
| 4131384 | 4/1993 | Germany . |
| 4221988 | 1/1994 | Germany . |
| 4330616 | 3/1994 | Germany . |
| 4424437 | 8/1995 | Germany . |
| 4421881 | 1/1996 | Germany . |
| 4426161 | 2/1996 | Germany . |
| 4429211 | 2/1996 | Germany . |
| WO 93/19961 | 10/1993 | WIPO . |

OTHER PUBLICATIONS

Search Report of the German Patent Office Relating to German Patent Application 196 03 383.7.

*Primary Examiner*—Lincoln Donovan
*Assistant Examiner*—Tuyen Nguyen
*Attorney, Agent, or Firm*—Rader, Fishman & Grauer PLLC

[57] ABSTRACT

The present invention relates to an electromagnetic valve which includes a retaining member (2) that is pressure-tightly connected to a valve sleeve (3), a magnetic armature (8) which is axially movable in the valve sleeve, a valve closure member (9) corresponding with a valve seat member (16) being mounted on the magnetic armature, and a magnetic core (12) fixed in the retaining member (2) to transmit the magnetic flux of an electric valve coil (10) from the magnetic armature (8) to the retaining member (2) and to a yoke ring (11) which abuts on the valve sleeve (3) and the retaining member (2). The valve seat member (16) is attached directly to the end surface of the magnetic core (12) which is remote from the magnetic armature (8).

8 Claims, 3 Drawing Sheets

ELECTROMAGNETIC VALVE

The present invention relates to an electromagnetic valve according to the preamble.

German patent application No. 42 21 988 discloses attaching a retaining member in the shape of a valve cartridge into the opening of a housing by means of a double self-calking engagement. The self-calking engagement essentially includes an indentation on the outside periphery of the retaining member into which the housing material is displaced by the advance movement during the assembly of the retaining member to provide a form lock. The disclosed attachment device is exclusively limited to mounting and closing the housing by the retaining member which has an electromagnetic valve. This necessitates separate attachment devices and provisions for the other, functionally relevant elements of the electromagnetic valve, what increases the expenditure in terms of structure and manufacture.

An object of the present invention is to improve upon an electromagnetic valve of the above-mentioned type to such effect that a simple, functionally reliable and small-size valve assembly for universal applications is provided with minimum expenditure in terms of structure and manufacture.

According to the present invention, this object is achieved in an electromagnetic valve of the generic type by the characterizing features of patent claim 1.

Further features, advantages and possible applications of the present invention can be seen hereinbelow in the subclaims and the description of several embodiments, making reference to the accompanying drawings.

Figure 1:
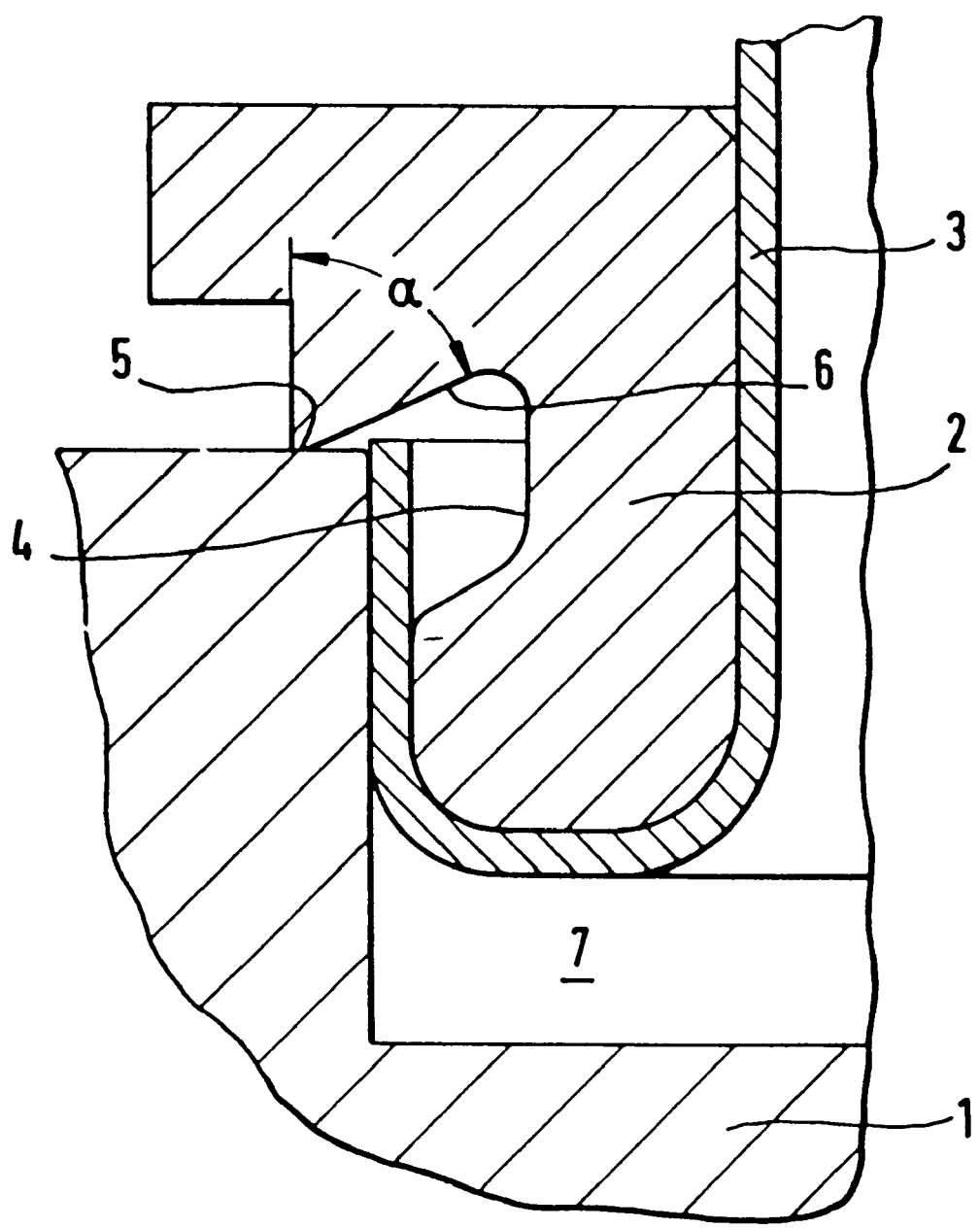
FIG. 1 is an enlarged structural view of some elements of the present invention.

FIG. 1 shows in a substantially enlarged view details of the subject matter of the present invention before the press-in operation is performed. A housing with a cylindrical opening 7 can be seen, into which extends, in sections, a cylindrical retaining member 2 with a shaped part 3 mounted on it. The shaped part 3 interposed between the housing 1 and the retaining member 2 which extends until an indentation 4 in the retaining member 2. The shaped part 3 covers the width of the groove-shaped indentation 4 in the retaining member 2 at least in part. Exactly as the retaining member 2, the shaped part 3 is configured as a sleeve in the present embodiment. The open end area of the shaped part 3 snugs largely against the inside and outside contour of the sleeve-shaped retaining member 2 and embraces the small-diameter end surface area of the retaining member 2 in the form of a circumferential groove on the retaining member 2. The indentation 4 provided on the outside periphery of the retaining member 2 between the two piston portions of the retaining member has an undercut 6. Between the undercut 6 and the outside contour of the retaining member 2, there is a wedge profile 5 (in the longitudinal cross-section in the drawing) having a wedge angle α between the undercut 6 and the outside contour which is smaller than 90°. This is an advantage in terms of manufacture both for the displacing effect of the housing material, which plastically deforms into the indentation 4, and the deformation of the shaped part 3 which must yield along with the housing material into the indentation 4. The above-mentioned final deformation and gas-tight and fluid-tight connection after the self-calking operation by the application of an outside axial force on the retaining member 2 may easily be seen in a special constructive embodiment in FIG. 2 which is in conformity with the demands of application. In consideration of the main elements of the attachment device shown in FIG. 1, it should be mentioned that when calking the retaining member 2, not only the material of the housing 1 (which is softer compared to the retaining member 2) is also displaced into the open end of the shaped part 3 into the indentation 4. Further, the thin-walled portion of the shaped part 3 which abuts on the retaining member 2 is under tensile stress due to the bead-type shaping of the inside end surface of the retaining member 2. This provides an absolutely reliable sealing between the shaped part 3 and the retaining member 2 and between the shaped part 3 and the housing 1. It is appropriate for tolerance reasons to deform and solidify the housing material to a greater extent than is necessary for the complete filling of the indentation 4. For this attachment operation, customary thin metal sheets are especially well suited because they not only are distinguished by the feature of a high degree of tensile stress and deformability but also permit being given low weight and small dimensions. Depending on the case of application, the shaped part 3 may be imparted almost any type of contour, thus rendering it appropriate for many functional tasks. The attachment device shown only in sections in the embodiment of FIG. 1 would thus be appropriate to accommodate further functional elements in positive and/or operative engagements. For example, the sleeve-shaped portion of the shaped part 3 which projects from the retaining member 2 can extend as an accommodation or support into a retaining or supporting device.

A specific embodiment for a suitable application of the above-described attachment device can be seen in FIGS. 2 and 3 hereinbelow.

Figure 2:
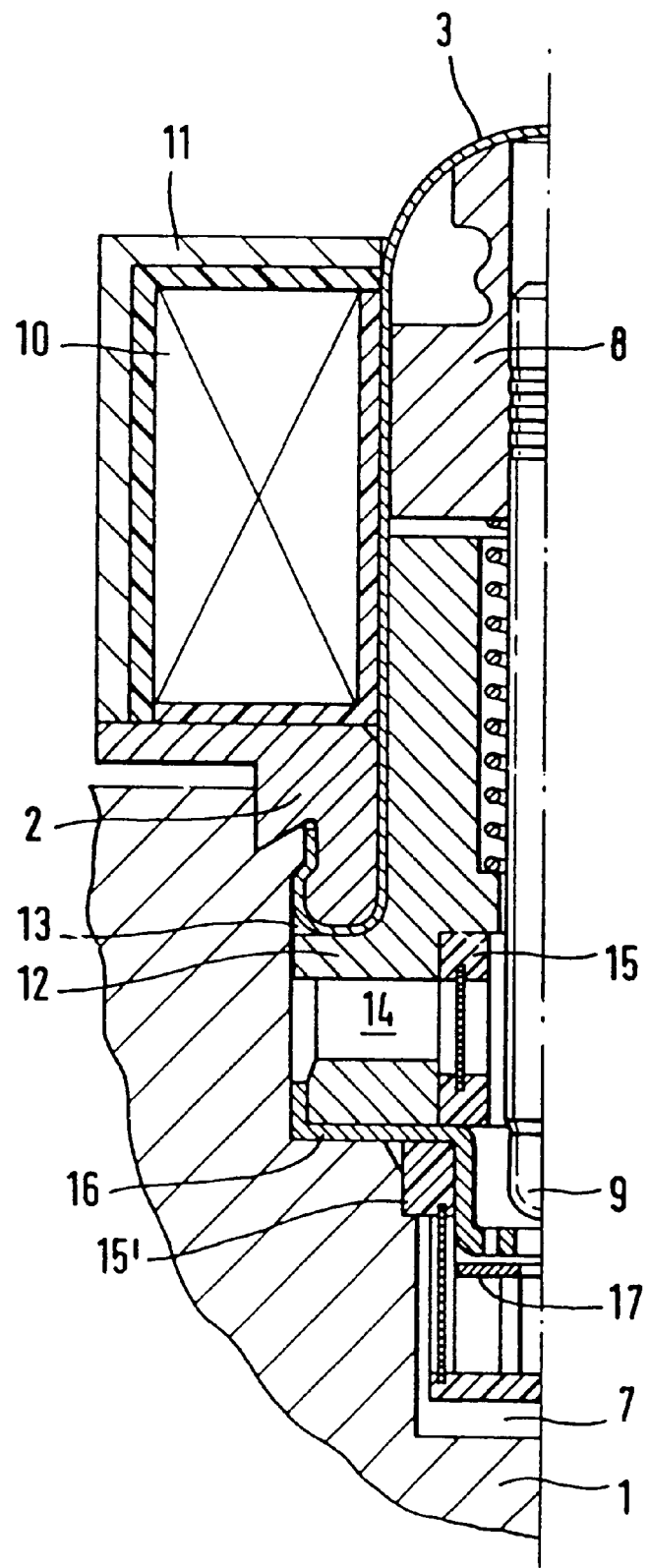
FIG. 2 is a special embodiment of the present invention implemented in an electromagnetic valve.

FIG. 2 shows a substantially enlarged cross-sectional view of an electromagnetic valve after the retaining member 2 has been pressed into the housing 1. The shaped part 3 is configured as a sleeve, exactly as described in FIG. 1. A magnetic armature 8 which cooperates with a valve closure member 9 is arranged in the dome-like closed area of the sleeve. To energize the magnetic armature 8, a valve coil 10 with a yoke ring 11 is mounted onto the retaining member 2 outside the shaped part 3. A substantially sleeve-shaped magnetic core 12 extends along the sleeve-shaped inside wall of the shaped part 3 up to before the magnetic armature 8. The magnetic core 12 in its bottom area is conformed to the contour of the open end of the shaped part 3 which is laid around the end surface of the retaining member 2. An interspace 13 remains between the curve of the shaped part 3 pointing to the indentation 4 and the housing 1 confined by the magnetic core 12. Interspace 13 permits additionally accommodating volume of the deformed housing material, if necessary. In order to ensure a virtually compact construction of the electromagnetic valve, the magnetic core 12 is enlarged in its diameter below its sleeve-shaped portion and adapted to the contour of the stepped opening 7 in the housing 1. The enlarged portion at the magnetic core 12 has a channel cross-section 14 which extends transversely to the valve axis. Channel cross-section 14 is followed by an annular filter element 15 in a longitudinal bore of the magnetic core 12. A valve seat member 16 is compressed between the enlarged frontal end area of the magnetic core 12 and a step in the opening 7. An annular filter element 15' is equally mounted between another stepped portion area of the opening 7 in the housing 1 and the valve seat member 16. Element 15' accommodates a plate-type non-return valve 17 in its interior. Valve seat member 16 is also manufactured from a thin sheet metal, preferably as a stamped metal part, and hardened. Both the through-bore to be closed by the valve closure member 9 and the bypass bore in the valve seat member 16 to be closed by the plate-type non-return valve 17 are favorably made by punching. Due to the positive engagement between the valve seat member 16 and the magnetic core 12, these two preassembled parts permit an unproblematic adjustment of the magnetic armature or the magnetic armature air slot on member 2 outside the housing 1.

Thus, it is ensured that minimal tolerance variations are maintained due to the disclosed attachment method of the valve in the housing 1 and the selection and configuration of the individual parts in the electromagnetic valve. The positive engagement between the valve seat member 16 and the magnetic core 12 is particularly supported by a snap-in or clamping engagement. This facilitates the preassembly of the valve parts. In the electromagnetic valve shown, the connection of the valve sleeve with the magnetic core 12 and the retaining member 2, compared to previous attachment methods, is limited to one single attachment point in the form of self-calking engagement. Besides, the result of the integration of the annular filter element 15 incorporated inside the magnetic core 12 and the integration of the small-size plate-type non-return valve 17 in the second annular filter element 15' is that the hollow space provided in the housing 1 is optimally utilized.

Figure 3:
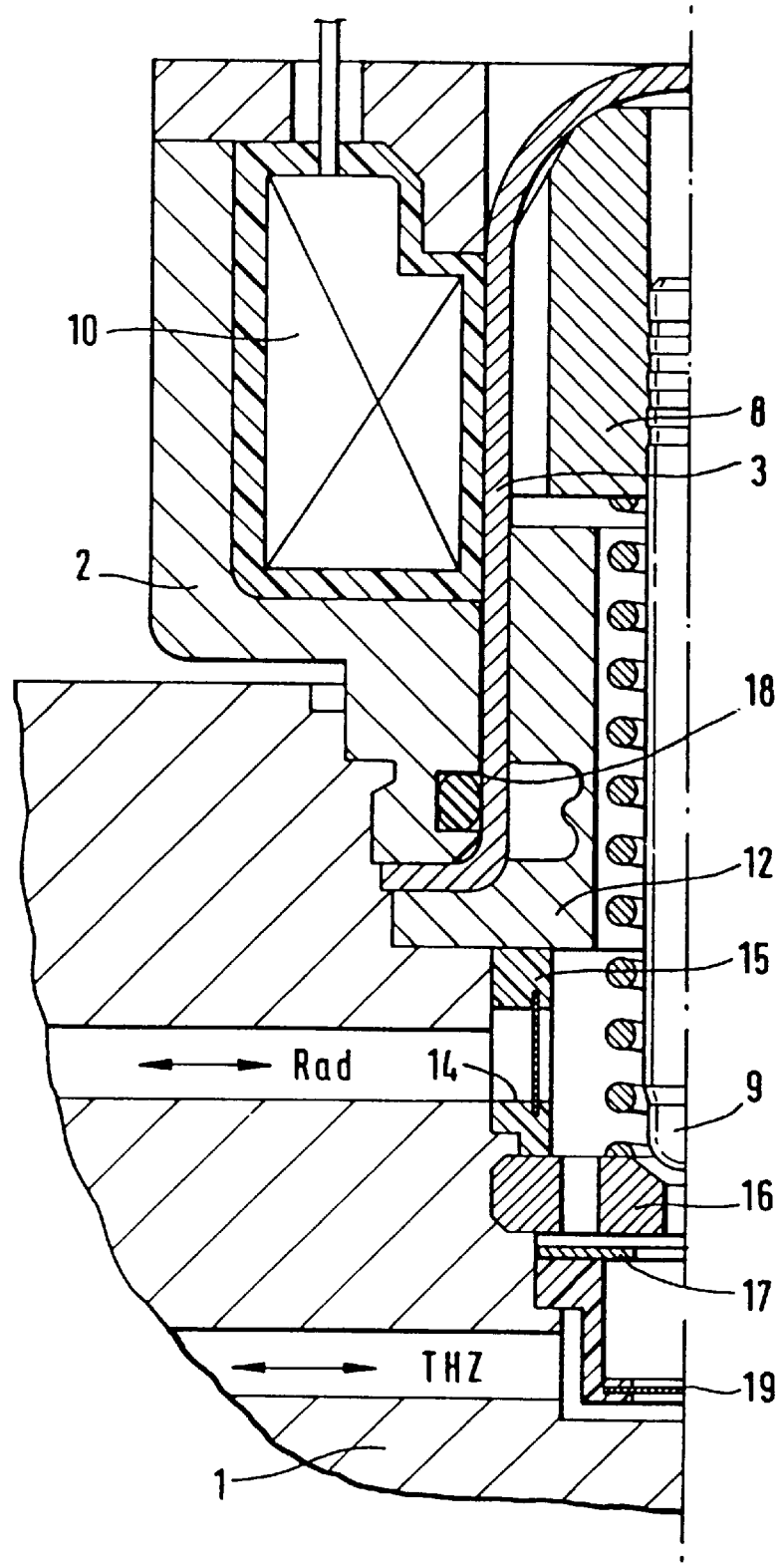
FIG. 3 is a variation of constructive details of the electromagnetic valve illustrated in FIG. 2.

Different from the embodiment of the electromagnetic valve in FIG. 2, the FIG. 3 embodiment shows an integral connection between the yoke ring 10 and the retaining member 2. In the area of the indentation 4, there is an internal annular groove 18 for accommodating a seal which bears against the sleeve-shaped portion of the shaped part 3. In contrast to the retaining member 2 being embraced by the end area of the shaped part 3, as shown in FIG. 2, the valve sleeve of FIG. 3 is exclusively offset at right angles and compressed between the surfaces of the magnetic core 12 and retaining member 2. This makes the arrangement of the above-mentioned seal appear suitable, if needed. The portion of the magnetic core 12 which extends along the offset on the valve sleeve is generally made of a thin-walled bead which is supported inside a bore step in the housing 1. Below the magnetic core 12, in turn, there is an annular filter element 15 which, different from FIG. 2, includes a channel cross-section 14 which leads to the valve closure member 9. The valve seat member arranged below the valve closure member 9 is configured as a valve plate with relatively thin walls, comparable with FIG. 2. The valve seat member 16, as shown in FIG. 2, accommodates a pressure fluid passage coaxially to the valve closure member 9. In the bypass, a passage is punched in the valve seat member 16 which extends to a plate-type non-return valve 18 positioned below the valve seat member 16. Valve 18 is succeeded by another plate-type filter element. Those details which have not been discussed in FIG. 3 correspond to the features disclosed in FIG. 2 or FIG. 1.

List of Reference Numerals:

1 housing
2 retaining member

-continued

List of Reference Numerals:

3 shaped part
4 indentation
5 wedge profile
6 undercut
7 opening
8 magnetic armature
9 valve closure member
10 valve coil
11 yoke ring
12 magnetic core
13 interspace
14 channel
15,15' annular filter element
16 valve seat member
17 plate-type non-return valve
18 internal annular groove
19 plate-type filter element

I claim:

1. Electromagnetic valve, comprising:

a retaining member that is pressure-tightly connected to a valve sleeve configured as a shaped part, a magnetic armature which is axially movable in the valve sleeve, a valve closure member corresponding with a valve seat member being mounted on the magnetic armature, a magnetic core fixed in the retaining member to transmit a magnetic flux of an electric valve coil from the magnetic armature to the retaining member and to a yoke ring that abuts on the valve sleeve and the retaining member, wherein the valve seat member is attached to an end surface of the magnetic core that is remote from the magnetic armature, wherein the valve seat member includes a first pressure fluid passage that is aligned coaxially to the valve closure member, and a second passage is provided in a bypass arrangement in the valve seat member, wherein an opening of said second passage is adapted to be closed by a plate-type non-return valve.

2. Electromagnetic valve as claimed in claim 1, wherein the plate-type non-return valve is movable between the valve seat member and a filter element.

3. Electromagnetic valve as claimed in claim 1, wherein the valve seat member is made from a hardened sheet-metal.

4. Electromagnetic valve as claimed in claim 2, wherein the valve seat member is made of a punched part.

5. Electromagnetic valve as claimed in claim 1, wherein the first and the second pressure fluid passages are formed in the valve seat member by punching the same.

6. Electromagnetic valve as claimed in claim 1, wherein the valve seat member is attached with the magnetic core on the retaining member.

7. Electromagnetic valve as claimed in claim 6, wherein the retaining member, magnetic core, valve seat member are operatively connected to each other.

8. Electromagnetic valve as claimed in claim 1, wherein the valve seat member is configured as a bowl-shaped valve plate.

\* \* \* \* \*